(No Model.)
O. E. KELLY.
SHAFT SUPPORT FOR VEHICLES.
No. 379,703. Patented Mar. 20, 1888.
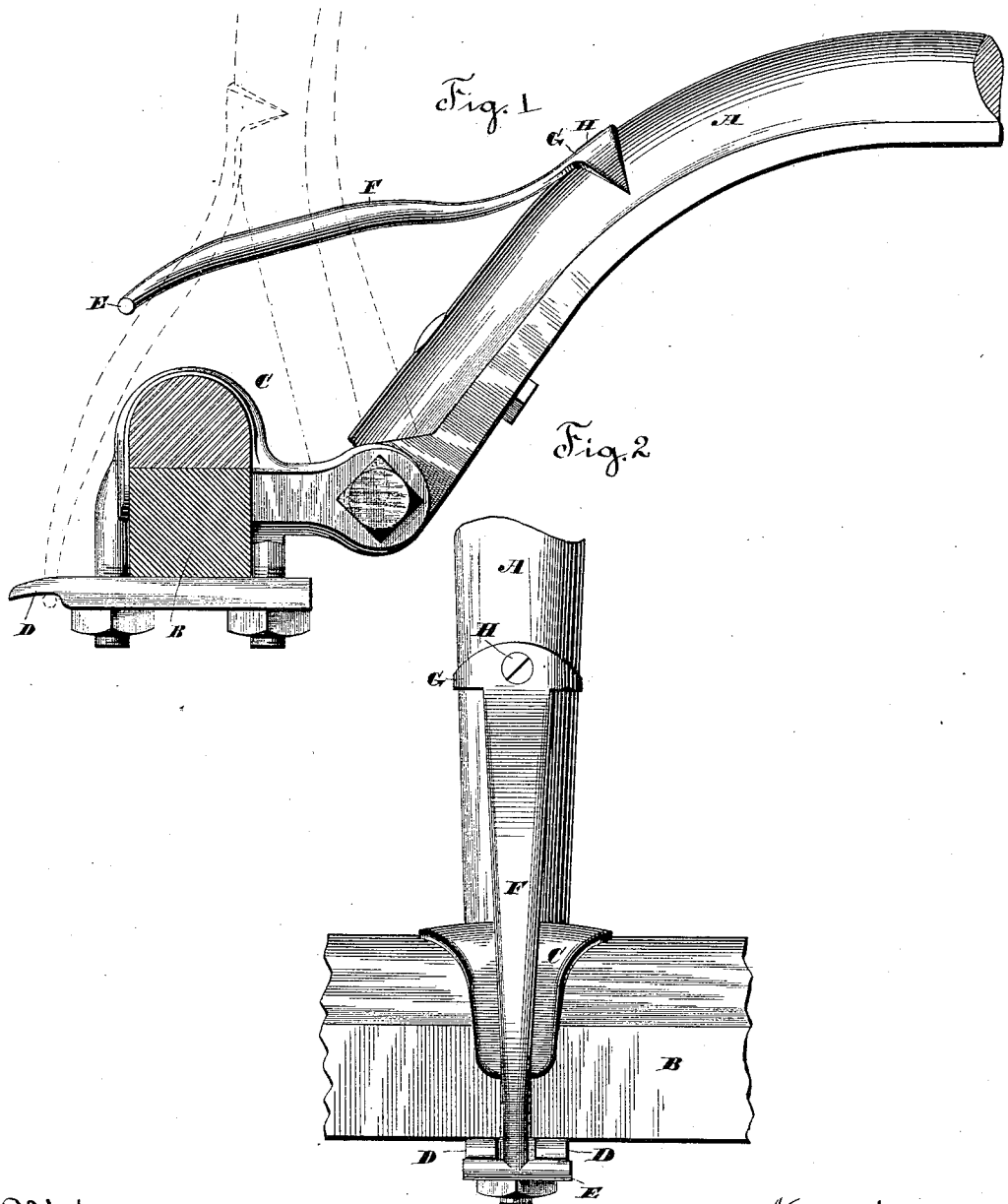

UNITED STATES PATENT OFFICE.

OWEN E. KELLY, OF BRISTOL, CONNECTICUT, ASSIGNOR OF ONE-HALF TO HENRY A. SEYMOUR, OF SAME PLACE.

SHAFT-SUPPORT FOR VEHICLES.

SPECIFICATION forming part of Letters Patent No. 379,703, dated March 20, 1888.

Application filed September 8, 1887. Serial No. 249,070. (No model.)

*To all whom it may concern:*

Be it known that I, OWEN E. KELLY, residing at Bristol, in the county of Hartford and State of Connecticut, have invented certain new and useful improvements in Shaft-Supporters; and I do declare the following to be a full, clear, and exact description of the same, reference being had to the accompanying drawings, which form a part of this specification.

My invention relates to an improvement in shaft-supporters, the object being to produce a device adapted to be permanently attached to the vehicle, and combining simplicity and cheapness of construction with ease of operation and durability and efficiency in use.

With these ends in view my invention consists in the combination, with the forward axle of a shaft of a vehicle, of a clip for such axle and shaft having its retaining-bar extended at the rear and formed into a hook, and a spring-catch provided at its lower end with a cross-bar for engagement with such hook and secured at its upper end to the upper face of the shaft.

In the accompanying drawings, Figure 1 is a view in side elevation showing my improved device, the full lines indicating the normal position of the shaft and the supporting device uncoupled and the broken lines indicating the coupled positions of the hook and catch and the elevated position of the shaft; and Fig. 2 is a view of the device in rear elevation, showing it coupled.

The shaft A and axle B and thill-coupling are of ordinary construction, except that the retaining-bar C of the clip D of the coupling is extended and slotted centrally at its rear end to form the two-pronged hook E, which is engaged by the cross-bar F of a spring-catch, G, provided at its upper end with a strap, H, adapting it to be clasped upon the shaft, to the upper face of which it is firmly secured by a screw, I, as shown. Normally the said hook and catch will be disengaged. When, however, it is desired to support the shafts, they are lifted until the cross-bar E engages with the hook D, which it rides over and snaps into, and thereafter remains engaged until lifted therefrom by hand, the opposite ends of the cross-bar being engaged with the under faces of the respective prongs of the hook, the slot of which receives the lower end of the spring-bar, whereby the latter is prevented from being detached from the hook by any lateral deflection or swaying of the shafts.

I am aware that a shaft-supporting device consisting of a spring-catch attached to the shaft and a hook extending rearwardly from the axle is not broadly new. I do not, therefore, broadly claim such a construction, but only the specific device herein shown and described.

Having fully described my invention, what I claim as new, and desire to secure by Letters Patent, is—

The combination, with the forward axle and a shaft of a vehicle, of a clip for such axle and shaft, having its retaining-bar extended at its rear end and centrally slotted to form a two-pronged hook, and a spring-bar secured at its upper end to the upper face of the shaft and provided at its lower end with a cross-bar, the opposite ends of which are respectively engaged with the under faces of the prongs of the hook, the slot of which receives the lower end of the spring-bar, substantially as set forth.

In testimony whereof I have signed this specification in the presence of two subscribing witnesses.

OWEN E. KELLY.

Witnesses:
EDSON M. PECK,
HENRY A. SEYMOUR.